J. BEAN.
CULINARY UTENSIL.
APPLICATION FILED JUNE 1, 1917.
1,293,303.
Patented Feb. 4, 1919.
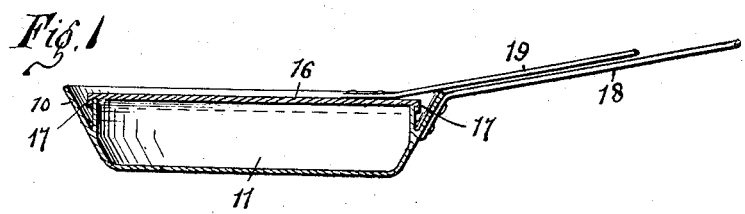
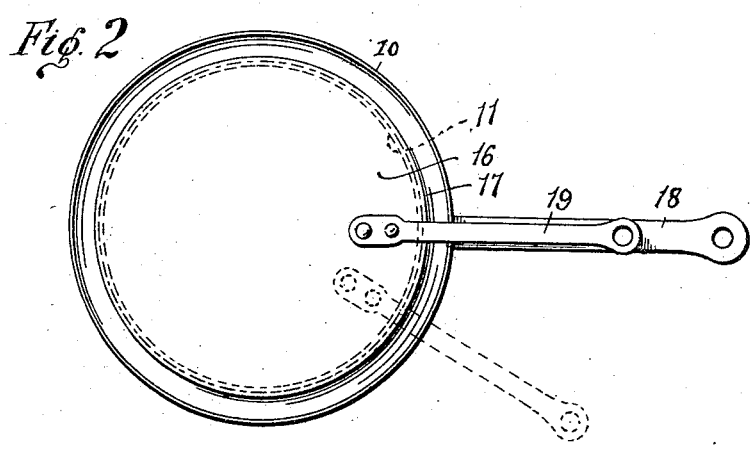
Inventor
J. BEAN.
Attorneys United States Patent Office.

JAMES BEAN, OF DUETT, LOUISIANA.

CULINARY UTENSIL.

1,293,303.  Specification of Letters Patent.  Patented Feb. 4, 1919.

Application filed June 1, 1917. Serial No. 172,223.

*To all whom it may concern:*

Be it known that I, JAMES BEAN, a citizen of the United States, residing at Duett, in the parish of Beauregard and State of Louisiana, have invented certain new and useful Improvements in Culinary Utensils, of which the following is a specification.

This invention relates to improvements in containers of various forms in which liquid substances are adapted to be boiled or otherwise subjected to heat, and has for one of its objects to provide a simply constructed attachment for containers of this character whereby liquid which may boil over will be caught and prevented from flowing over the outer walls of the container and likewise whereby substance or matter rising to the surface is caused to flow over the sides of the container thereby producing a self-skimming device.

Another object of the invention is to provide a device of this character whereby the contents of the container is automatically cooled around the edges to reduce liability to overflow.

Another object is to provide a device of this character including a receptacle having a lateral handle and a trough like encompassing flange to receive the overflow, and a closure having a laterally directed handle so arranged that the handle of the receptacle and the handle of the closure may be grasped by one hand.

With these and other objects in view, the invention consists in certain novel features of construction, as hereinafter shown and described and then specifically pointed out in the claim.

The improved device may be applied to any form of container in which substances are adapted to be boiled or otherwise subjected to heat, and is more particularly adaptable to utensils for domestic use in the boiling of meats, vegetables and the like.

In the accompanying drawings—

Figure 1 is a sectional elevation of a saucepan shaped utensil illustrating one manner of applying the invention, Fig. 2 is a plan view of the structure shown in Fig. 1, the handle of the cover being shown in dotted lines out of alinement with the handle of the receptacle.

The improved device comprises in general an outwardly and upwardly inclined flange 10 applied to the outer wall of the container, indicated as a whole at 11, and located a short distance below the upper edge, with the upper edge of the flange extending above the upper edge of the container, as shown. The flange 10 is circular in outline and entirely surrounds the rim of the vessel or container and is spaced laterally therefrom to form a circumferential trough. By this arrangement as the contents of the container is heated to the boiling point, any foam or the like which may be produced flows over the upper edge of the container and is caught within the trough.

The container 11 is provided with a lateral handle 18 extending obliquely to the plane of the container and the cover plate or closure 16 is likewise provided with a handle 19 which is shorter than the handle 18 and extends substantially in parallel relation to and over the same when the closure 16 is disposed in one position, as shown in full lines in Figs. 1 and 2. The handle 19 thus extends over the upwardly directed edge of the flange so that the closure 16 may swing around to any required extent and thus dispose the handle 19 at any required point, as shown in dotted lines in Fig. 2. The closure is thus independent of the receptacle, while at the same time the handles 18 and 19 are disposed in close relation, as shown in Figs. 1 and 2, and the handles may be grasped by one hand, thus enabling the closure to be retained in position by the same hand which lifts or moves the container. The cover plate or closure 16 is preferably provided with a depending marginal flange which extends downwardly within the trough and bears against the outer wall of the rim of the container. When the cover 16 is removed, any material which may rise to the surface of the contents of the container will be caused to flow over the upper edge thereof and into the trough thus producing a self-skimming apparatus. It will be noted that the two handles may be conveniently grasped to retain the cover in place while pouring from the trough the material which has overflowed from the container.

Having thus described the invention, what is claimed as new is:

A container having a vertically disposed imperforate rim, the upper edge of which is continuous, an outwardly and upwardly inclined imperforate flange encompassing the rim of the container and spaced from the rim to form an intermediate trough, said flange having its upper edge projecting above the upper edge of the rim and its lower edge merged into the outer face of the container at a point directly beneath and spaced from the upper edge of the rim, a handle for the container secured to the outer face of the inclined flange and projecting laterally and upwardly from the container, a flat solid cover plate resting on the upper edge of the container and provided with a vertically disposed depending flange extending downwardly within the trough and bearing against the outer wall of the rim of the container, and a handle rigidly secured to the upper surface of the flat cover plate and adapted to overlie and extend parallel with the handle of the container, the upper surface of the flat cover plate being disposed in a plane below the plane of the upper edge of the inclined flange.

In testimony whereof I affix my signature.

JAMES BEAN. [L. S.]

Copies of this patent may be obtained for five cents each, by addressing the "Commissioner of Patents, Washington, D. C."